Patented Sept. 5, 1922.

1,428,152

UNITED STATES PATENT OFFICE.

HENRY JOHN DYKMAN, OF JOHANNESBURG, TRANSVAAL, SOUTH AFRICA.

STOVING PAINT FOR VEHICLES.

Application filed December 1, 1919. Serial No. 341,630.

*To all whom it may concern:*

Be it known that HENRY JOHN DYKMAN, a British subject, residing at 14 6th Avenue, Bezuidenhout Valley, Johannesburg, Transvaal Province of the Union of South Africa, has invented certain new and useful Improvements in Stoving Paint for Vehicles, of which the following is a specification.

The present invention consists in a composition of matter constituting a paint of the kind adapted to be hardened by stoving.

The invention provides a means for painting motor vehicles in particular, which is more rapid than the present methods, gives a very hard and glossy surface and can be stoved at a comparatively low temperature such as may be applied to an upholstered motor body without detriment to the upholstery.

A paint according to this invention is characterized by the presence of hydraulic cement in conjunction with other usual ingredients which form a stoving paint. The effect of the cement is to cause the paint to harden to a greater degree and at a lower stoving temperature than would otherwise be the case.

The invention is further characterized by the admixture of kerosene in suitable proportions to make the paint spread freely and with a smooth finish, the kerosene being evaporated before or during the stoving. It is found that as compared with other paint vehicles which can be used for the purpose stated, kerosene obviates blistering and cracking of the paint when heated.

The following are examples of specific mixtures suitable for carrying the invention into effect. The formula given is for the vehicle; pigment being added, in conformity with ordinary practice, in quantity according to its covering power and the desired thickness of the paint.

A. *Undercoat.*

Varnish, about 1 gallon;
Gold size, about ½ gallon;
Glue size, about ¼ gallon;
Raw linseed oil, about ¼ gallon;
Kerosene, about 1 gallon;
Portland cement, about 8 oz.

B. *First coat.*

Varnish, about 1 gallon;
Gold size, about ½ gallon;
Raw linseed oil, about ¼ gallon;
Kerosene, about ½ gallon;
Portland cement, about 1 lb.

C. *Finishing coat.*

Varnish, about 2 gallons;
Gold size, about ½ gallon;
Kerosene, about ⅛ gallon;
Portland cement, about 8 oz.
Benzine, as required.

The above composition may be stoved with satisfactory results at a temperature of 50° centigrade, which is so low as not to injure leather, cloth or paper.

Cement is also added to the stopping or filling mixtures. The following compositions for instance may be used:—

D. *Stopping putty.*

Whiting, about 3 lbs.;
Ground bone, about 1 lb.;
Raw linseed oil, about $\frac{1}{22}$ part of a gallon;
Glue size, about $\frac{1}{22}$ part of a gallon;
Gold size, about $\frac{1}{16}$ part of a gallon;
Portland cement, about 8 oz.

E. *Filling liquid.*

Whiting, about 2 lbs.;
Ground bone, about 2 lbs.;
Gold size, about ½ gallon;
Varnish, about ¼ gallon;
Turpentine, about ¼ gallon;
Portland cement, about 1 lb.

As an example of carrying out the invention on a previously painted car fitted with upholstery, the old paint is removed or rubbed down by any appropriate means. One underground coat (A) is then applied and stoved. It is preferred to attain the maximum temperature slowly by having the oven merely warm when the article is introduced and reaching the temperature of 50° centigrade or thereabout in approximately 1 hour. After that period the article is removed from the oven, stopping putty is applied to screw holes and the like, a filling coat applied if necessary, when the stoving is repeated as for the underground coat. The paint is then rubbed down and the first coat (B) applied and stoved, again as for the underground coat. Thereafter the finishing coat (C) is applied and the final stoving is given. In this case the temperature should be raised slowly for an hour as before, and the maximum temperature continued for a somewhat prolonged period, say five hours. The paint may then be polished and the process is completed.

If the old paint is in such condition that no filler is required, it is sufficient to apply the underground coat (A), which is rubbed down and stoved and then apply the final coating (C) omitting coating (B). In some cases the final coating (C) only can be used. By operating according to the method described, the painting of a car may be completed within 24 hours as compared with the two or three weeks at present required satisfactorily to paint and varnish a car. The resulting coating moreover is much superior in hardness, durability and glossiness to the ordinary painted product and the temperature employed is sufficiently low to enable a complete car to be treated without stripping its upholstery.

I claim:

1. Stoving paint including as ingredients hydraulic cement, kerosene and varnish.

2. As a new article of manufacture a stoving paint including as ingredients, gold size, kerosene, and hydraulic cement.

3. As a new article of manufacture a stoving paint including as ingredients, varnish, gold size, kerosene, and Portland cement.

4. As a new article of manufacture a stoving paint including as ingredients, varnish, gold size, linseed oil, kerosene, and hydraulic cement.

In testimony whereof I affix my signature.

HENRY JOHN DYKMAN.